United States Patent
Arakelian

(10) Patent No.: US 7,573,229 B2
(45) Date of Patent: Aug. 11, 2009

(54) PORTABLE WATER RESISTANT MULTI-FUNCTION LEAD-ACID BATTERY BOX

(75) Inventor: Richard Arakelian, New South Wales (AU)

(73) Assignee: ARK Corporation Pty Ltd., New South Wales (AU)

( * ) Notice: Subject to any disclaimer, the term of this patent is extended or adjusted under 35 U.S.C. 154(b) by 306 days.

(21) Appl. No.: 10/570,969

(22) PCT Filed: Sep. 10, 2003

(86) PCT No.: PCT/AU03/01179

§ 371 (c)(1),
(2), (4) Date: Mar. 7, 2006

(87) PCT Pub. No.: WO2005/024977

PCT Pub. Date: Mar. 17, 2005

(65) Prior Publication Data

US 2007/0024236 A1    Feb. 1, 2007

(51) Int. Cl.
*H01M 10/46* (2006.01)
(52) U.S. Cl. .................................................... 320/107
(58) Field of Classification Search ................. 320/107, 320/106, 110, 112, 114, 115
See application file for complete search history.

(56) References Cited

U.S. PATENT DOCUMENTS

| 5,077,513 A | 12/1991 | Dea et al. |
| 5,217,540 A * | 6/1993 | Ogura ................. 136/251 |
| 6,222,342 B1 | 4/2001 | Eggert et al. |
| 6,807,127 B2 * | 10/2004 | McGeever, Jr. ......... 367/128 |

FOREIGN PATENT DOCUMENTS

| AU | 673446 | 2/1995 |
| DE | 20207721 | 8/2002 |
| WO | WO 2004/001160 | 12/2003 |

OTHER PUBLICATIONS

"Portable Battery Packs", Aug. 26, 2001, available at http://www.solar-dc-marine.com/SDMWAECO/raps_batteries.htm, pp. 1-2.
Examiner's Report No. 1 on Patent Application No. 2003258369 by Ark Corporation Pty Ltd., dated Jul. 11, 2008.
Examiner's Report No. 2 on Patent Application No. 2003258369 by Ark Corporation Pty Ltd., dated Aug. 27, 2008.
International Search Report for International (PCT) Patent Application No. PCT/AU03/01179, mailed Nov. 12, 2003.

* cited by examiner

*Primary Examiner*—Edward Tso
(74) *Attorney, Agent, or Firm*—Sheridan Ross P.C.

(57) ABSTRACT

The invention provides a battery box including a body (1) for housing a lead acid battery (2), the body having a base (3) and sides (4) extending from the base to define an open top (5). A lid (6) is applicable to the body to close the top. In use, the lid has at least one generally vertically oriented side (7). Each one of a plurality of relatively water sensitive electrical components is electrically connectable to the battery and housed substantially within the lid. The electrical components each have a user interface located on the vertically oriented side (7) thereby to inhibit damage to the electrical component as a result of water ingress.

19 Claims, 5 Drawing Sheets

PORTABLE WATER RESISTANT MULTI-FUNCTION LEAD-ACID BATTERY BOX

FIELD OF THE INVENTION

The invention relates to a lead acid battery box. The battery box has been specifically designed for use marine applications, as well as in recreational vehicles and as a portable power supply for a range of outdoor activities. The invention will be described hereinafter with reference to such applications. However, it will be appreciated that the invention is not limited to this particular field of use.

BACKGROUND OF THE INVENTION

The following discussion of the prior art is intended to place the invention in an appropriate technical context and to allow its significance properly to be appreciated. The discussion of prior art should in no way be considered as an admission that such prior art is widely known or forms part of common general knowledge in the field.

Portable lead acid battery boxes are known in the prior art. Prior art battery boxes typically include a prismatic body for containing a lead acid battery and a removable lid. The lid fits over a top portion of the box, thereby to provide a degree of water protection to the battery.

Some prior art battery boxes include electronic components connected to the battery. However, these components are often inadequately shielded from water, thereby creating a substantial risk of damage to the relatively sensitive electrical components and also increasing the risk of accidental electrocution.

Another problem with prior art battery boxes is that separate external equipment is required to charge the battery.

It is an object of the present invention to overcome or ameliorate one or more of the disadvantages of the prior art, or at least to provide a useful alternative.

SUMMARY OF THE INVENTION

Accordingly, a first aspect of the invention provides a portable water resistant lead acid battery box including:

a body for housing a lead acid battery, said body having a base and sidewalls extending from said base to define an open top;

a lid applicable to said body to close said top, said lid, in use, having at least one generally vertically oriented side; and at least one relatively water sensitive electrical component electrically connectable to said battery and housed at least substantially within said lid, said electrical component having a user interface located on said vertically oriented side thereby to inhibit damage to said electrical component as a result of water ingress.

Preferably, the at least one electrical component includes a battery recharger operable on the battery, the user interface for the recharger being connectable to an external power source. More preferably, the battery box includes two user interfaces for the recharger, a first recharger interface being a DC port to allow the battery to be recharged from a 12V power source and a second recharger interface being an AC port to allow the battery to be recharged from mains power.

Preferably, the recharger is of the type providing a higher charging current until the battery is close to its rated capacity and then switching to a lower conditioning current. More preferably, the higher charging current is around 1.0 Amps. Even more preferably, the conditioning current is around 0.1 Amps.

A second aspect of the invention provides a portable lead acid battery box including:

a body for housing a lead acid battery, said body having a base and sidewalls extending from said base to define an open top;

a lid applicable to said body to close said top; and a battery recharger for recharging the battery, said recharger being contained at least substantially within a volume defined by said body and said lid.

Preferably, the recharger is of the type providing a higher charging current until the battery is close to its rated capacity and then switching to a lower conditioning current. More preferably, the higher charging current is around 1.0 Amps. Even more preferably, the conditioning current is around 0.1 Amps.

Preferably, the battery box includes two user interfaces for the recharger, a first recharger interface being a DC port to allow the battery to be recharged from a 12V power source and a second recharger interface being an AC port to allow the battery to be recharged from mains power.

Preferably, in use, the lid includes at least one vertically oriented side. More preferably, the battery box includes at least one relatively water sensitive electrical component electrically connectable to the battery and housed at least substantially within the lid, the electrical component having a user interface located on the vertically oriented side, thereby to inhibit damage to the electrical component as a result of water ingress.

Preferably, the battery box as defined in either aspect above includes an external battery terminal electrically connectable to a corresponding terminal of the battery, the external terminal being housed within a recess in the lid. More preferably, a protective cover is hingedly connected to the lid adjacent the recess, the cover being movable between an open configuration allowing access to the external terminal and a closed configuration providing a degree of protection to the terminal.

Preferably, the battery box includes an isolating switch movable between an on position to provide electrical connectivity between the battery and the electrical components and an off position where the electrical connectivity is broken between the battery and at least one of the electrical components. More preferably, when the isolating switch is moved to the off position, electrical connectivity is maintained between the battery and both the AC port and the battery condition indicator.

Preferably, the recharger is of the type allowing for continuous operative connection to the battery Preferably, the battery box includes a recess located generally centrally within the lid and a carrying handle hingedly connected to the lid within the recess, such that when not in use the handle can be moved into a stored position wherein the handle is substantially contained within the recess.

Preferably, the battery box includes a waterproof membrane applied to the vertical face and extending over one or more of the user interfaces.

According to a third aspect, the invention provides an accessory for an electrical device, said accessory including:

a first electrical connector:

an electrical cable connected at one end to said first connector;

a second electrical connector connected to the other end of said cable; and a current regulator to limit the current passing through said accessory to less than a predetermined maximum current.

Preferably, the predetermined maximum current is less than around 15 A. More preferably, the predetermined maximum current is less than around 10 A. Even more preferably, the predetermined maximum current is less than around 6 A.

Preferably, the accessory includes a cut-out switch to limit the voltage being supplied to a device to which the accessory is connected to less than a predetermined maximum voltage. More preferably, the predetermined maximum voltage is less than around 20 V. Even more preferably, the predetermined maximum voltage is less than around 15 V. In a particularly preferred form, the predetermined maximum voltage is less than around 13.2 V.

Preferably, the first electrical connector is a male 12 V DC cigarette lighter plug.

Preferably, the second electrical connector is a male 12 V DC cigarette lighter plug. Alternatively, the second connector includes a pair of alligator clips.

Preferably, the current regulator is located in one of the electrical connectors. Alternatively, the current regulator is located intermediate the first and second electrical connectors.

BRIEF DESCRIPTION OF THE DRAWINGS

Preferred embodiments of the invention will now be described, by way of example only, with reference to the following drawings in which.

PREFERRED EMBODIMENTS OF THE INVENTION

Figure 1:
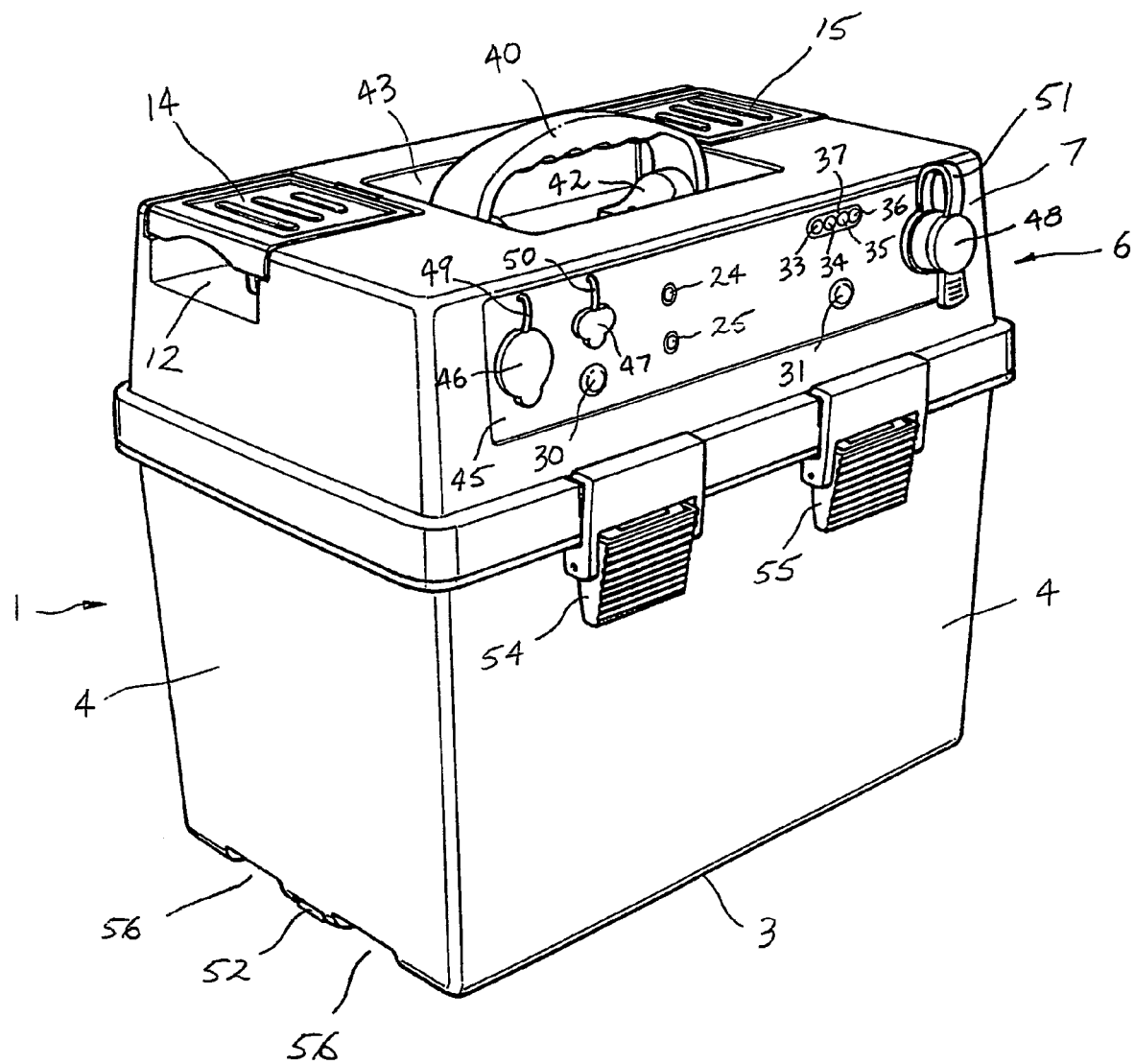
FIG. 1 is a perspective view of a portable water resistant lead acid battery box according to one aspect of the invention, shown in a closed configuration.

Referring to the drawings, the battery box includes a body 1 for housing a lead acid battery 2, the body having a base 3 and sides 4 extending from the base to define an open top 5. A lid 6 is applicable to the body to close the top. In use, the lid has at least one generally vertically oriented side 7. Each one of a plurality of relatively water sensitive electrical components is electrically connectable to the battery and housed substantially within the lid. The electrical components each have a user interface located on the vertically oriented side 7 thereby to inhibit damage to the electrical component as a result of water ingress.

Figure 2:
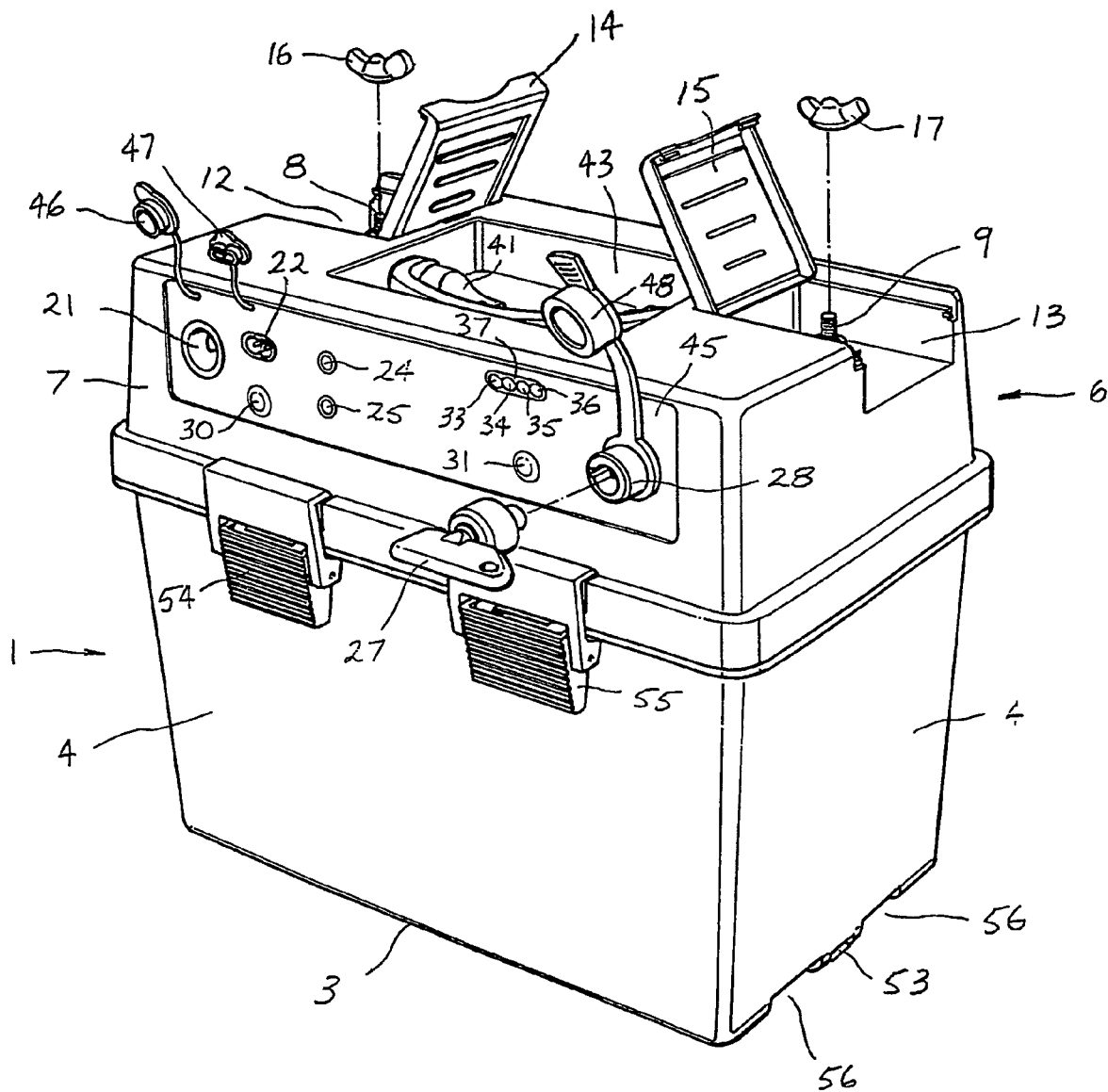
FIG. 2 is a perspective view of the battery box of FIG. 1, shown in an open configuration.
Figure 3:
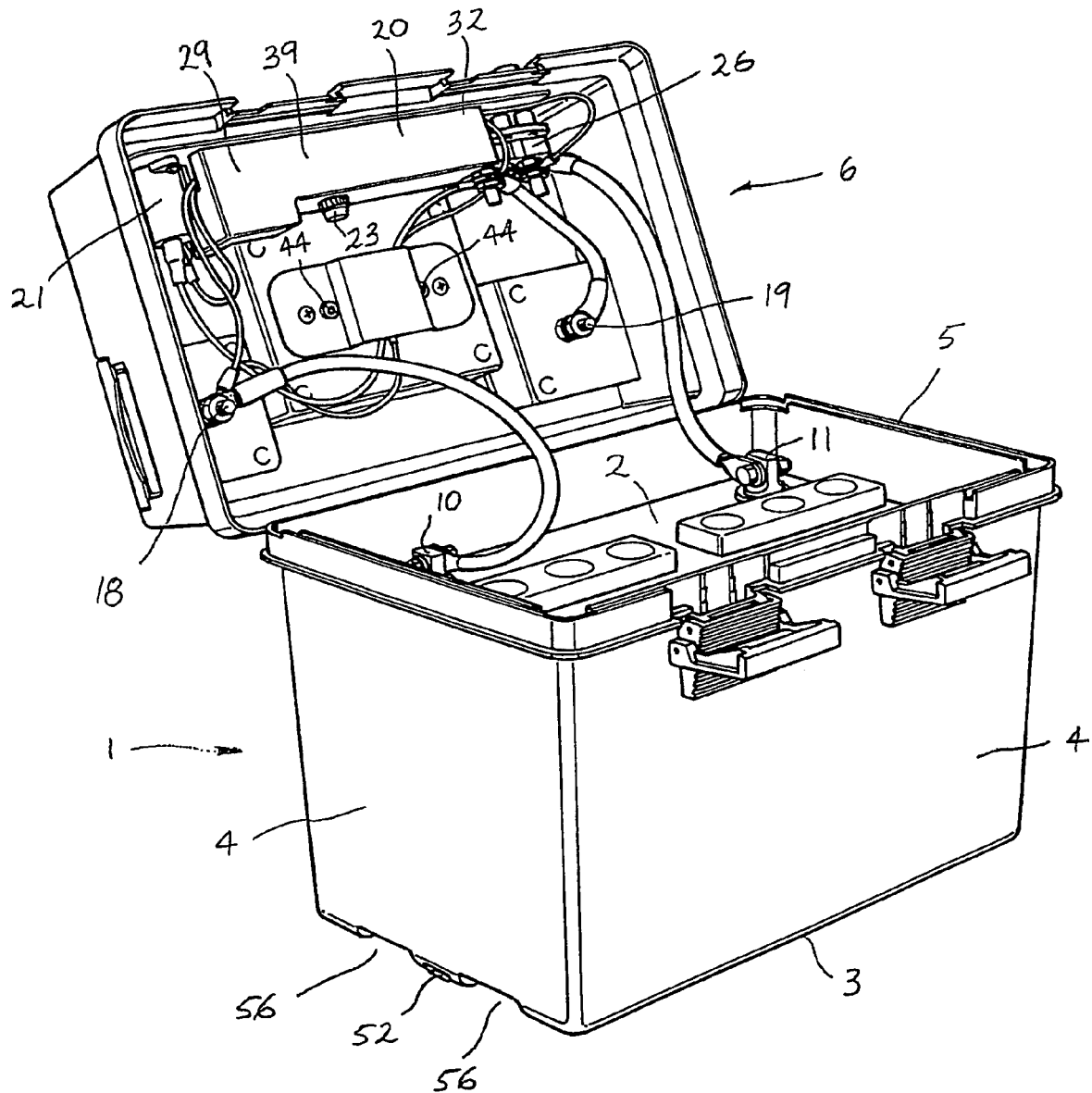
FIG. 3 is an underside view of the battery box lid.
Figure 4:
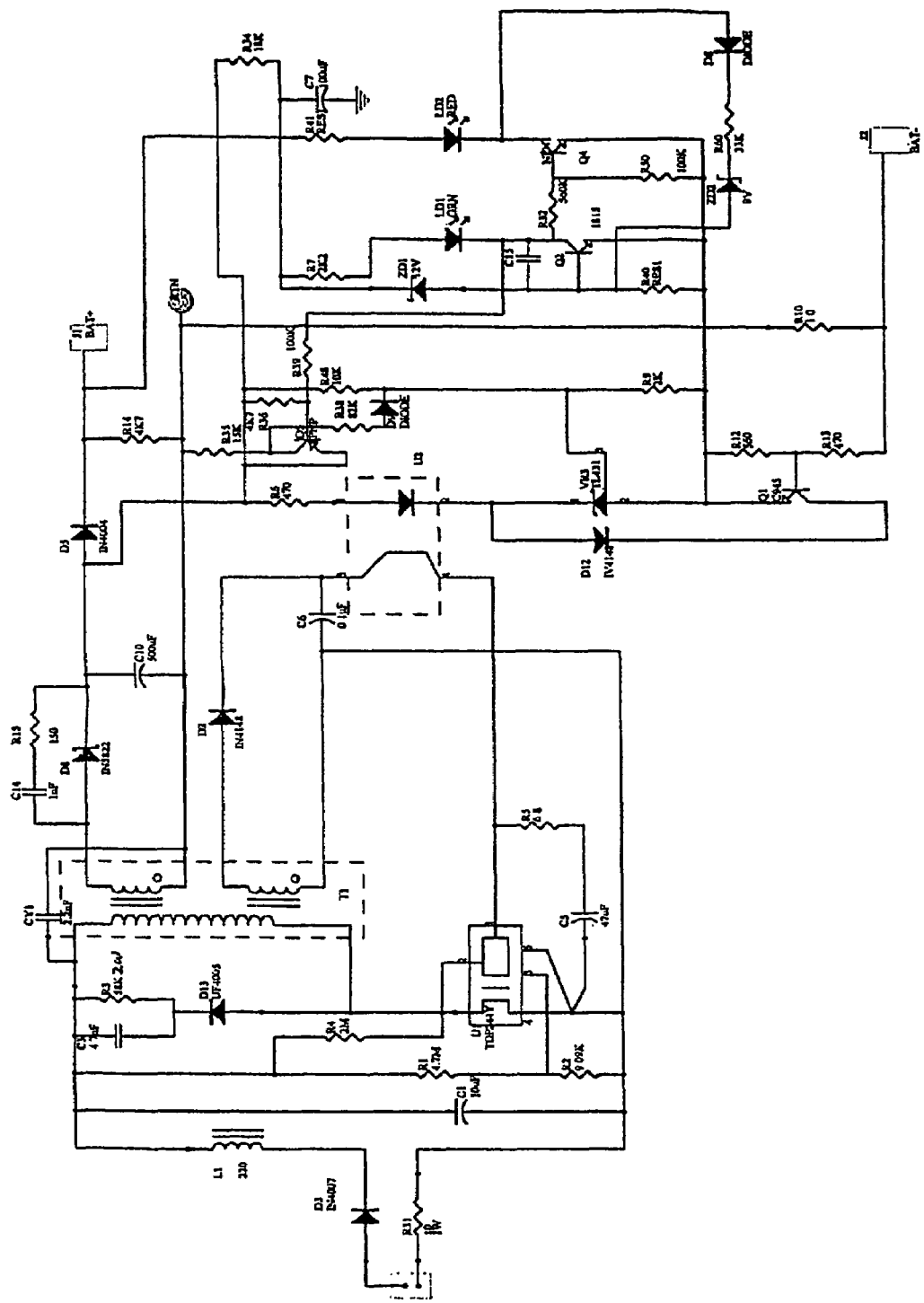
FIG. 4 is a circuit diagram indicating the electrical connectivity of the electrical components of the battery box.
Figure 5:
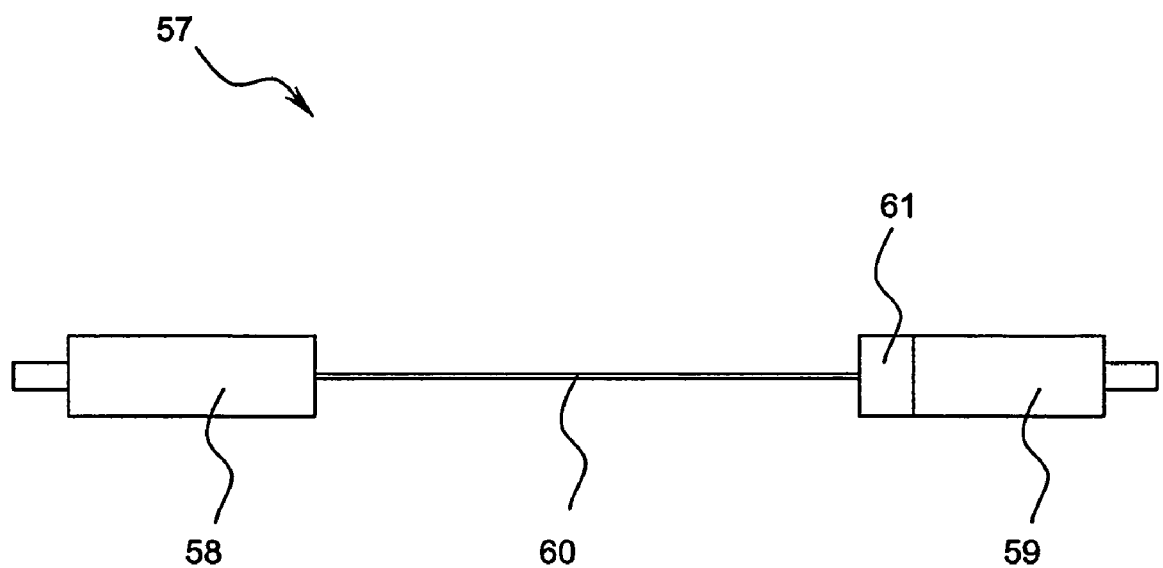
FIG. 5 is a schematic view of an electrical accessory according to one aspect of the invention.

The battery box also includes a pair of external battery terminals 8 and 9 electrically connectable to corresponding terminals 10 and 11 of the battery. Each of the external terminals is housed within a respective recess 12 and 13 in a peripheral portion of the lid and is provided with a degree of protection by a protective cover 14 and 15 hingedly connected to the lid adjacent the recess. The protective cover is movable between an open position allowing easy access to the terminal as shown in FIG. 2 and a closed protective position as shown in FIGS. 1 and 3.

Each of the external terminals includes a threaded solid brass terminal post at one end. A respective wing nut 16 and 17 is threadably engageable with its respective terminal post and includes an insulated coating to allow manual tightening of the nut without risk of electrocution. The other end of each terminal extends through the lid and terminates in a threaded portion, respectively 18 and 19. The threaded portions 18 and 19 facilitate electrical connection of the respective external terminals with the battery and other electrical components. A PVC cover (not shown) extends over the threaded portion to prevent accidental electrical shorting.

A polarity indicator tab (not shown) is provided on each terminal post. The tab is formed from an electrically non-conductive material and includes indicia in the form of a "+" or "−" sign respectively. The tab includes mounting aperture of diameter slightly greater than that of the respective terminal post. In use, the tab is engaged with the respective terminal post to indicate the polarity of the associated battery terminal. In alternative embodiments, the tab may also be colour coded to indicate the polarity of the associated terminal.

One of the electrical components is a battery recharger/conditioner 20 operable on the battery 2. The recharger/conditioner includes two user interfaces for connecting the battery to an external power source. One of the user interfaces is a 12V DC input/output port 21 to allow the battery to be recharged from a 12V power source, such as second battery (not shown), and the other is a multi-voltage AC port 22 to allow the battery to be recharged from mains power. The particular AC port shown in the drawings is suitable for use with a mains power voltage of between 100 V and 240 V. A 0.25 Amp fuse 23 is included to safeguard the recharger/conditioner against overloading. The 12 V DC input/output port is protected against inverse polarity by a 1.5 Amp fuse (not able to be seen in FIGS. 1 to 3).

In a charging mode, the battery recharger/conditioner provides a higher charging current of 1.0 Amps until the battery has achieved a voltage of around 14.2 V. The recharger/conditioner then automatically lowers the charging current progressively to 0.1 Amps and allows the battery voltage to drop to around 13.2 V. At this point, the recharger/conditioner switches into a conditioning mode wherein a current of 0.1 Amps and a voltage of 13.2 V are supplied to the battery. The state of the battery is continuously monitored by the recharger/conditioner and if the battery charge drops below 13.2 V, the above recharging cycle is repeated.

Status indicators for charge and float are also provided by means of respective red and green LEDs 24 and 25 viewable through respective apertures in the vertical side 7 of the battery box. The status indicators indicate whether the recharger/conditioner is operating in a charging mode indicated by the red LED or a conditioning mode indicated by the green LED. The recharger/conditioner also includes conditioning means to allow continuous operative connection to the battery without risking damage to the battery.

The battery box includes an isolating switch 26 to selectively electrically isolate various ones of the electrical components. The isolating switch is actuated by inserting a key 27 into an isolating switch user interface 28 and rotating the key between an on position to provide electrical connectivity between the battery and the electrical components and an off position where the electrical connectivity is broken between the battery and at least one of the electrical components. In the embodiment shown in the drawings, when the isolating switch is in the off position, electrical connectivity is broken to all of the electrical components other than the AC port and the battery condition indicator. In this way, unused components can be deactivated for safety, while still allowing the battery to be recharged using the AC port 22 and the battery condition to be checked. Due to the inclusion of this feature, it will be appreciated that the isolating switch must be in the on position when the battery is being charged using the DC port 21.

A 10 Amp circuit breaker 29 is also provided to prevent overloading of the 12V DC output/input port 21. The circuit breaker is automatically tripped when a current of greater than 10 Amps is being drawn from the 12V DC input/output port. The circuit breaker is reset by pressing a circuit breaker user interface 30.

The battery box also includes a battery charge indicator for detecting a charge condition of the battery. The charge indicator includes a user interface 31 located on the vertical side 7 of the battery box lid. The charge indicator user interface is electrically connected to a circuit board 32 that is in turn electrically connected to the battery 2. The circuit board is connected to four light emitting diodes (LEDs) 33, 34, 35 and 36. Each of the LEDs corresponds to a particular state of battery charge, respectively a state of one-quarter charge, half charge, three-quarter charge and full charge. The LEDs are displayed in an elongate window 37 provided in the vertical side of the battery box lid. A coloured window pane covers each LED. The first LED 33 is covered by a red pane, the second 34 by a yellow pane and the third 35 and fourth 36 LEDs by green panes. It will be appreciated that when one of the LEDs is lit, the respective window pane is illuminated. The battery charge indicator is actuated by pressing the user interface 31, which completes an electrical circuit between the circuit board, LEDs and the battery. While the interface 31 remains pressed, the LED corresponding to the relevant state of charge, and also each LED corresponding to lower states of charge, remains lit. Accordingly, when the battery contains no charge, none of the LEDs and the associated panes is illuminated. However, when the battery is in a state of one-quarter charge, only LED 33 is lit, thereby illuminating the red pane. Similarly, when the battery is in a state of half charge, LEDs 33 and 34 are lit, thereby illuminating both the red and the yellow pane. When the battery is in a state of three-quarter charge, LEDs 33, 34 and 35 are lit and the associated panes are illuminated. Finally, when the battery is fully charged, all of the LEDs are lit and all of the panes are illuminated. Once the interface 31 is released, the circuit is broken between the circuit board, LEDs and the battery and all of the LEDs are extinguished.

In some embodiments (not shown), the LEDs are supplemented with indicia on the vertical side of the lid, the indicia indicating the state of battery charge either graphically or numerically. It will be appreciated that in other embodiments (not shown), the charge indicator may indicate the state of battery charge in a variety of ways. For example, a clear window pane may be used in combination with coloured LEDs.

The recharger/conditioner, circuit breaker and charge indicator are protected both from mechanical damage, and from electrical damage as a result of shorting, by a hard plastic housing 39 connected to an interior wall of the lid.

The battery box also includes a recessed carrying handle 40 located generally centrally within the lid 6. The carrying handle is hingedly connected by hinge formations 41 and 42 to the side walls of a central recess 43 within the lid, such that when not in use the handle can be rotated into a stored position wherein no part of the handle projects outwardly of the recess. The hinge formations are fastened to the lid by countersunk corrosion resistant stainless steel fasteners 44. A silicon seal (not able to be seen in the drawings) is applied around the points of contact of the hinge formations with the battery box lid in order to prevent ingress of water.

The battery box also includes a waterproof membrane 45 applied to the vertical side 7 and extending over each of the user interfaces. The membrane is continuous over the circuit breaker interface and the charge indicator interface. However, the membrane includes a first aperture (not able to be seen in the drawings) aligned to fit around the 12V DC input/output port interface 21, a second aperture (not able to be seen in the drawings) aligned to fit around the AC port interface 22 and a third aperture (not able to be seen in the drawings) aligned to fit around the isolating switch interface 28. As such, the membrane effectively waterproofs the circuit breaker interface 30 and the charge indicator interface 31. Separate first 46, second 47 and third 48 removable waterproofing covers are provided to waterproof the 12V DC input/output port interface, the AC port interface and the isolating switch interface respectively. Each of the waterproofing covers is captively retained to the battery box lid by a respective retaining leash 49, 50 and 51. Each waterproofing cover and corresponding retaining leash is integrally formed from a suitable plastics material.

The body 1 and lid 6 of the battery box are formed from an impact resistant and relatively chemically inert plastics material, such as polypropylene. A mounting aperture 52 and 53 is provided on longitudinally opposite outer sides of the battery box. The aperture is adapted for sliding engagement by a longitudinally slidable movable locking tongue (not shown) connected to a surface (not shown) on which the battery box is to be supported. The battery box also includes a pair of retaining clips 54 and 55 releasably to secure the lid 6 in a closed position. The base of the battery box also includes a pair of longitudinal drainage channels 56 to permit flow of liquid under the box. The battery box also includes adequate ventilation apertures (not shown) in the vertical walls of the recesses 12 and 13 to facilitate venting of any gases that may be produced during recharging of the battery.

It will be appreciated that the illustrated battery box may be connected to a vehicle cigarette lighter output port (not shown) to charge a battery. However, the applicant has found that if the battery box is directly connected to the vehicle cigarette lighter port, the cigarette lighter port is likely to be overloaded, particularly if the battery to be charged is low in charge. Accordingly, an accessory 57 for the battery box is also provided to limit the charge drawn from the vehicle cigarette lighter port by the battery box.

The accessory 57 includes a pair of male cigarette lighter port adaptors 58 and 59 connected by an electrical cable 60. The accessory also includes a current regulator 61 operable between the male adaptors to limit the maximum current through the cable to 6 A. In the illustrated embodiment, the regulator is housed within one of the male adaptors. However, it will be appreciated that in other embodiments, the regulator is located at another position on the accessory, for example, intermediate the male adaptors. The accessory also includes a cut-out switch (not shown) to prevent the voltage of the battery being charged increasing above 13.2 V.

In an alternative embodiment (not shown), the accessory includes a single male adaptor at one end of an electrical cable and another form of electrical connector at the other end. For example, the other electrical adaptor may take the form of a pair of "alligator" clips.

In an alternative embodiment, not shown, the regulator and cut-out switch are included in the battery box lid and are operable on the 12V DC input/output port respectively to limit the current drawn by the battery during recharge and the maximum battery charge.

It will be appreciated that the illustrated embodiments of the invention provide a battery box that facilitates drainage of water away from sensitive electrical components. Accordingly, the risk of water damage to these electrical components is reduced, as is the probability of accidental electrocution.

The illustrated embodiments also provide an integrated battery recharger/conditioner to allow in-situ recharging of the battery.

It will be appreciated that the illustrated battery box is well suited to use in a variety of applications where a 12V power supply is required. In particular, the battery box may be used to power 12V equipment used when boating, camping or in many other outdoor activities where a portable source of 12V power is required or useful.

In all of the above respects, the invention represents a practical and commercially significant improvement over the prior art.

Although the invention has been described with reference to specific embodiments, it will be appreciated that it may be embodied in many other forms.

The claims defining the invention are as follows:

1. A portable water resistant lead acid battery box comprising;
   a body for removably housing a lead acid battery, said body having a base, and sidewalls extending from said base to define an open top;
   a lid applicable to said body to close said top, said lid, in use, having at least one generally vertically oriented side;
   at least one relatively water sensitive electrical component electrically connectable to said battery and housed at least substantially within said lid, said electrical component having a user interface located on said vertically oriented side thereby to inhibit damage to said electrical component as a result of water ingress, wherein said at least one electrical component includes a battery recharger operable on said battery, said battery charger providing a higher charging current until said battery is close to its rated capacity and then said battery charger switching to provide a lower conditioning current.

2. A battery box according to claim 1, further including:
   two user interfaces for said recharger, a first recharger interface being a DC port to allow said battery to be recharged from a 12V power source and a second recharger interface being an AC port to allow said battery to be recharged from mains power.

3. A battery box according to claim 1, wherein said higher charging current is around 1.0 Amps and said conditioning current is around 0.1 Amps.

4. A battery box according to claim 1, further including:
   an external battery terminal electrically connectable to a corresponding terminal of said battery, said external terminal being housed within a recess in said lid and a protective cover hingedly connected to said lid adjacent said recess, said cover being movable between an open configuration allowing access to said external terminal and a closed configuration providing a degree of protection to said terminal.

5. A battery box according to claim 1, further including:
   an isolating switch movable between an on position to provide electrical connectivity between said battery and said electrical components and an off position where said electrical connectivity is broken between said battery and at least one of said electrical components.

6. A battery box according to claim 5, wherein when said isolating switch is moved to said off position, electrical connectivity is maintained between the battery and both the AC port and the battery condition indicator.

7. A battery box according to claim 1, wherein said recharger is of a type allowing for continuous operative connection to said battery.

8. A battery box according to claim 1, further including:
   a waterproof membrane applied to said vertical face and extending over one or more of said user interfaces.

9. A portable lead acid battery box comprising:
   a body for removably housing a lead acid battery, said body having a base, and sidewalls extending from said base to define an open top;
   a lid applicable to said body to close said top;
   a battery recharger for recharging the battery, said recharger being contained at least substantially within a volume defined by said body and said lid; and
   wherein said recharger is of a type providing a higher charging current until said battery is close to maximum capacity and then switching to a lower conditioning current.

10. A battery box according to claim 9, wherein said higher charging current is around 1.0 Amps and said conditioning current is around 0.1 Amps.

11. A battery box according to claim 9, further including:
    two user interfaces for said recharger, a first recharger interface being a DC port to allow said battery to be recharged from a 12V power source and a second recharger interface being an AC port to allow said battery to be recharged from mains power.

12. A battery box according to claim 9, wherein, in use, said lid includes at least one vertical side.

13. A battery box according to claim 12, further including:
    at least one relatively water sensitive electrical component electrically connectable to said battery and housed at least substantially within said lid, said electrical component having a user interface located on said vertical side, thereby to inhibit damage to the electrical component as a result of water ingress.

14. A battery box according to claim 13, wherein said at least one electrical component includes said recharger.

15. A battery box according to claim 9, further including:
    an external battery terminal electrically connectable to a corresponding terminal of said battery, said external terminal being housed within a recess in said lid and a protective cover hingedly connected to said lid adjacent said recess, said cover being movable between an open configuration allowing access to said external terminal and a closed configuration providing a degree of protection to said terminal.

16. A battery box according to claim 13, further including:
    an isolating switch movable between an on position to provide electrical connectivity between said battery and said electrical components and an off position where said electrical connectivity is broken between said battery and at least one of said electrical components.

17. A battery box according to claim 16, wherein when said isolating switch is moved to said off position, electrical connectivity is maintained between the battery and both the AC port and a battery condition indicator.

18. A battery box according to claim 9, wherein said recharger is of a type allowing for continuous operative connection to said battery.

19. A battery box according to claim 13, further including:
    a waterproof membrane applied to said vertical side and extending over one or more of said user interfaces.

* * * * *